Aug. 14, 1923.

M. W. HOLCOMB

HAND SHIELD

Filed July 16, 1921

1,464,529

Patented Aug. 14, 1923.

1,464,529

UNITED STATES PATENT OFFICE.

MOLLIE W. HOLCOMB, OF ERIE, PENNSYLVANIA.

HAND SHIELD.

Application filed July 16, 1921. Serial No. 485,323.

*To all whom it may concern:*

Be it known that I, MOLLIE W. HOLCOMB, a citizen of the United States, residing at Erie, in the county of Erie and State of Pennsylvania, have invented new and useful Improvements in Hand Shields, of which the following is a specification.

The object of this invention is to produce a holder by means of which a person may grasp a cooking utensil without burning the hands, and one which will be cheap, endurable and easy to keep clean.

With these and other objects in view as will be brought out later herein, reference will be had to the accompanying drawing, which forms a part of this specification, and wherein like numerals of references designate corresponding parts throughout the several views, in which:—

Figure 1:
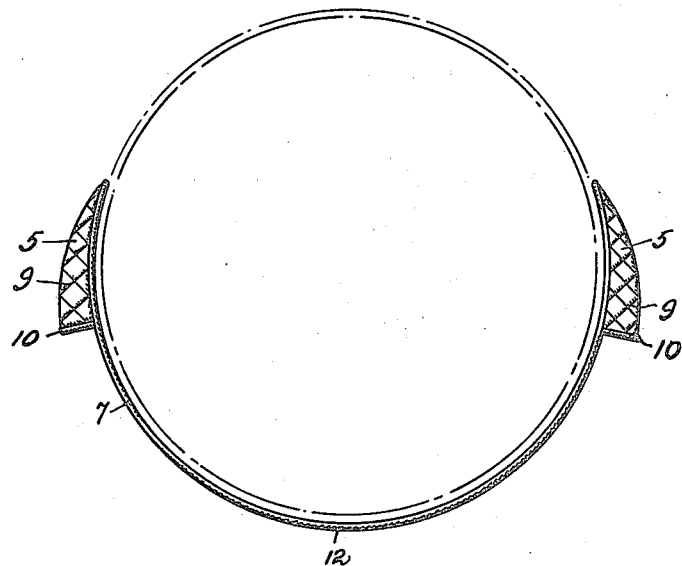
Figure 2:
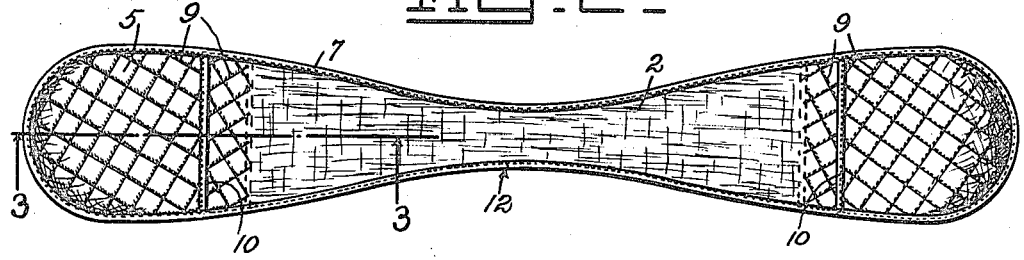
Figure 3:
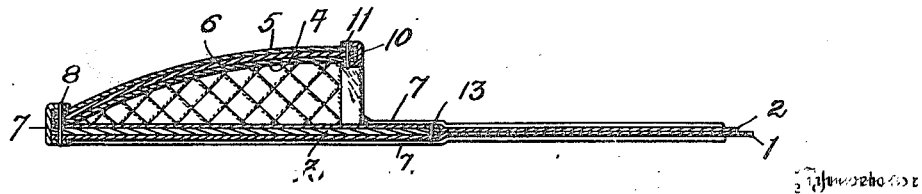

Fig. 1 is a plan view of the invention in the position which it occupies when placed around a cooking utensil preparatory to removing the same from place to place, as from an oven, Fig. 2 is a view in side elevation of the invention, and Fig. 3 is a vertical sectional view taken through the device at one end only, or on the line 3—3 of Fig. 2.

Referring to the accompanying drawing, reference numeral 1 designates the base layer, and 2 the upper layer of the body portion, both similarly shaped and cut from some suitable material, such as coarse muslin. Between them, at each of their ends is contained an intermediate filler or padding layer 3, cut from suitable material, such, for example, as batting, canton flannel, asbestos or the like, and conforming to the shape of the end portions of the body layers 1 and 2. Pockets are provided at each end of the body portion and consist of three similarly shaped layers 4, 5 and 6 cut from suitable material, as muslin for the layers 4 and 5 and coarse cotton for the intermediate layer 6. The entire edge portion of the device is bound with suitable tape 7, stitched as indicated by numeral 8 through and through the edge portions of the layers 1, 3, 2, 4, 6, 5 and the tape, the latter being folded over these edge portions in the customary manner. Each pocket terminates several inches from the ends of the body portion, being of a depth only to receive the fingers of the hand, about up to the knuckles. If desired, the three layers 1, 3, 2 as well as the three layers 4, 6, 5 are quilted as indicated by numeral 9, and across the marginal edge of each pocket extends binding tape 10 secured by stitches 11 which extend through the two folds of the tape 10 and through the three layers 4, 5, 6 and being secured beneath the binding tape 7 to conceal its ends. The selection of material, of course, is understood to be optional, as well as the specific shape adopted and other minor details not specifically set forth in the claims.

The mode of use is as follows: When a hot pan or the like is to be moved from one place to another, particularly from an oven, the device forming the subject matter of this invention is placed about the pan in the manner indicated in Fig. 1, by the user inserting one hand in each pocket and then placing the hands at opposite sides of the pan as in the usual procedure of grasping the pan. In this position, the intermediate portion 12 will also be engaged with the pan, and at certain times, this intermediate portion will come into play to move the pan in a direction away from the user. Grasped in this manner, the pan may be easily removed from an oven without danger of burning or spilling any of the contents onto the hands, and at the same time, no part of the device will come into contact with oven parts to cause sticking as is the case with a loose rag. Of course, it is manifest that the hands need not be placed within the pockets, or that the device be used in the manner shown in Fig. 1, i. e. with the pockets outermost, since when in haste, the device may be used with the pockets innermost and the ends of the device merely grasped within the hand while being placed against the sides of the pan.

The intermediate portion 12 being flexible serves as a means for suspending the device on a hook or nail, in position ready to receive the hands within the pockets. Also by means of this intermediate portion 12, the device may be hung upon a towel rack or over a line for drying after being washed.

Having fully described the invention, what is claimed as new is:—

1. A device of the character described, comprising a body portion formed of two layers of flexible material, a third layer between said two layers adjacent the ends of the body portion, and hand receiving pockets adjacent each end of the body portion.

2. A device of the character described, comprising a body member, heat resisting members attached to the ends of the body, the portion of the body member lying intermediate the heat resisting members being of such length as to permit it to circumferentially embrace comparatively one-half of the rim of a cooking utensil, and finger receiving pockets at the ends of the body member overlying the heat resisting members.

3. A device of the character described, comprising a body member, heat resisting members attached to the ends of the body, the portion of the body member lying intermediate the heat resisting members being of such length as to permit it to circumferentially embrace comparatively one-half of the rim of a cooking utensil, and finger receiving pockets at the ends of the body member overlying the heat resisting members, said body member having its medial portion reduced in width to increase its flexibility and permit it to be hung in folded condition on a support.

In testimony whereof I have hereunto set my hand in presence of two subscribing witnesses.

MOLLIE W. HOLCOMB.

Witnesses:
 JOHN WAGNER,
 ELLA M. DEIBEST.